(12) United States Patent
E Silva et al.

(10) Patent No.: US 11,451,103 B2
(45) Date of Patent: Sep. 20, 2022

(54) INSULATION BODY FOR AN ELECTRICAL MACHINE

(71) Applicant: Mahle International GmbH, Stuttgart (DE)

(72) Inventors: Roberto Almeida E Silva, Stuttgart (DE); Bernd Blankenbach, Boeblingen (DE); Terry Cox, Swinford (GB); Philip Grabherr, Stuttgart (DE); Niklas Kull, Stuttgart (DE); Tim Male, Telford (GB); Peter Pisek, Leitring (AT); Peter Sever, Murska Sobota (SI); Josef Sonntag, Nuertingen (DE); Martin Williams, Northkampton (GB)

(73) Assignee: Mahle International GmbH

( * ) Notice: Subject to any disclaimer, the term of this patent is extended or adjusted under 35 U.S.C. 154(b) by 353 days.

(21) Appl. No.: 16/687,164

(22) Filed: Nov. 18, 2019

(65) Prior Publication Data

US 2020/0161917 A1     May 21, 2020

(30) Foreign Application Priority Data

Nov. 19, 2018    (DE) .......................... 102018219820.9

(51) Int. Cl.
*H02K 3/24*      (2006.01)
*H02K 3/34*      (2006.01)
*H02K 3/30*      (2006.01)

(52) U.S. Cl.
CPC ................. *H02K 3/24* (2013.01); *H02K 3/30* (2013.01); *H02K 3/345* (2013.01)

(58) Field of Classification Search
CPC .. H02K 3/24; H02K 3/30; H02K 3/32; H02K 3/34; H02K 3/345; H02K 9/02;
(Continued)

(56) References Cited

U.S. PATENT DOCUMENTS

| 5,214,325 A | 5/1993 | Matson et al. |
| 8,508,085 B2 | 8/2013 | Bradfield |

(Continued)

FOREIGN PATENT DOCUMENTS

| DE | 102015214788 A1 | 2/2017 |
| DE | 102017221803 A1 | 6/2019 |

(Continued)

OTHER PUBLICATIONS

Murakami et al, English Machine Translation of JPH10271738 (Year: 1998).*

*Primary Examiner* — Rashad H Johnson
(74) *Attorney, Agent, or Firm* — Fishman Stewart PLLC

(57) ABSTRACT

An electrical machine includes a rotor that is rotatable about a rotation axis, and includes a stator having electrically conductive stator windings. The machine includes a cooling channel through for cooling the stator windings. The stator has teeth extending arranged at a distance from one another along a circumferential direction of the rotor, the stator teeth protruding inwardly and carrying the stator windings. An interspace is formed between two stator teeth which are adjacent in the circumferential direction. An interspace is arranged in an insulation body having outer walls composed of a plastic, which delimit a body interior, in which a winding zone and a channel zone are provided. A stator winding is arranged in the at least one winding zone of the insulation body and a cooling channel for a is arranged in the at least one channel zone of the insulation body.

29 Claims, 5 Drawing Sheets

(58) Field of Classification Search
CPC .. H02K 9/04; H02K 9/12; H02K 9/16; H02K 9/19; H02K 9/22; H02K 9/225
USPC ............... 310/12.21, 52, 54, 56, 58, 64, 65, 310/216.001, 216.003, 216.105
See application file for complete search history.

(56) References Cited

U.S. PATENT DOCUMENTS

| | | |
|---|---|---|
| 2010/0090549 A1 | 4/2010 | Gerstler et al. |
| 2014/0300220 A1* | 10/2014 | Marvin .................... H02K 3/24 |
| | | 310/54 |
| 2016/0111933 A1 | 4/2016 | Takimoto |
| 2017/0037858 A1 | 2/2017 | Back et al. |
| 2018/0254673 A1 | 9/2018 | Koizumi et al. |
| 2019/0245399 A1 | 8/2019 | Mashkin et al. |
| 2020/0296954 A1* | 9/2020 | Cope ........................ A01G 7/00 |
| 2021/0036568 A1* | 2/2021 | Schulz .................... H02K 3/12 |
| 2021/0044160 A1* | 2/2021 | Leiber .................... H02K 1/187 |
| 2021/0328471 A1* | 10/2021 | Bockenhoff ........... H02K 3/527 |

FOREIGN PATENT DOCUMENTS

| | | | |
|---|---|---|---|
| JP | H10271738 | * | 10/1998 |
| WO | WO-2018007071 A1 | | 1/2018 |

* cited by examiner

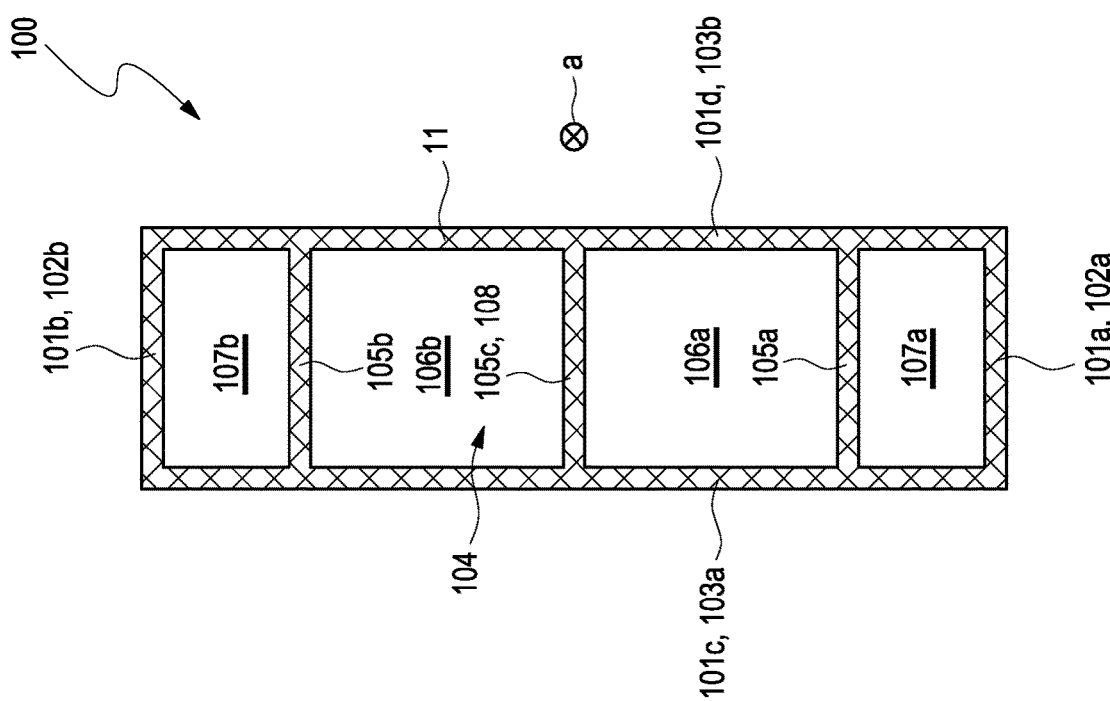
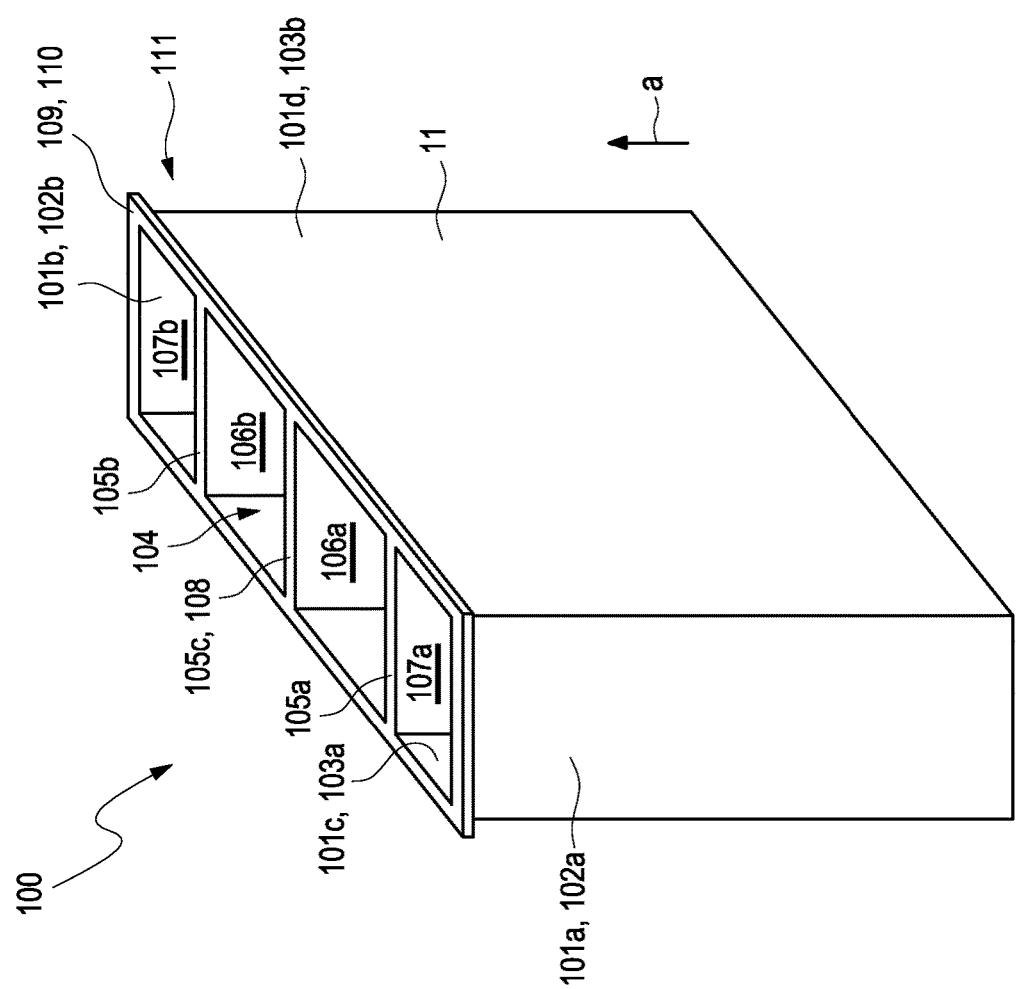
Fig. 1
Fig. 2

INSULATION BODY FOR AN ELECTRICAL MACHINE

CROSS-REFERENCE TO RELATED APPLICATIONS

This application claims priority to German Patent Application No. DE 10 2018 219 820.9, filed on Nov. 19, 2018, the contents of which are hereby incorporated by reference in their entirety.

TECHNICAL FIELD

The invention relates to an electrical machine, particularly for a motor vehicle, comprising an insulation body. The invention also relates to a motor vehicle comprising such an electrical machine.

BACKGROUND

An electrical machine of this type can generally be an electric motor or a generator. The electrical machine can be embodied as external rotor or as internal rotor.

A machine of the generic type is known from U.S. Pat. No. 5,214,325, for example. It comprises a housing, which surrounds an interior and which has a casing extending circumferentially in a circumferential direction of the housing and radially delimiting the interior, axially at one side a rear side wall axially delimiting the interior, and axially at the other side a front side wall axially delimiting the interior. A stator of the machine is fixedly connected to the casing. A rotor of the machine is arranged in the stator, wherein a rotor shaft of the rotor is mounted rotatably by way of a front shaft bearing on the front side wall.

The stator of a conventional electrical machine typically comprises stator windings, which are electrically energized during operation of the machine. This gives rise to heat which has to be dissipated in order to avoid overheating and associated damage or even destruction of the stator. For this purpose, it is known from conventional electrical machines to equip the latter with a cooling device for cooling the stator—in particular said stator windings. Such a cooling device comprises one or more cooling channels through which a coolant flows and which are arranged in the vicinity of the stator windings in the stator—typically in the stator slots, that is to say in the interspaces between two stator teeth which are adjacent in the circumferential direction of the stator, which also receive the stator windings. Heat transfer from the stator windings to the coolant enables heat to be dissipated from the stator.

In this case, it proves to be disadvantageous that efficient heat transfer from the stator to the coolant flowing through the respective cooling channel is only realizable with considerable structural complexity. However, this has a disadvantageous effect on the production costs of the electrical machine.

What furthermore proves to be problematic in the case of conventional machines is that, under certain circumstances, an undesired electrical short circuit can occur between the stator windings and the coolant passed through the cooling channel and between the stator windings and the stator teeth of the stator if the winding insulation of the stator windings is damaged—for example owing to manufacturing or caused in the course of assembly—and, after the stator windings have been introduced in the interspace, said stator windings—for instance on account of assembly—touch the cooling channel or the coolant or the stator teeth.

SUMMARY

Therefore, it is an object of the present invention to provide an improved embodiment for an electrical machine in which this disadvantage is largely or even completely eliminated. In particular, the intention is to provide an improved embodiment for an electrical machine which is distinguished by improved cooling of the stator windings of the stator.

This object is achieved by means of the subject matter of the independent patent claims. The dependent patent claims relate to preferred embodiments.

Accordingly, the basic concept of the invention is to provide an electrical insulation body which can be inserted as a prefabricated structural unit into an interspace—the so-called stator slot—between two stator teeth of a stator of an electrical machine. After the insulation body has been inserted into the interspace or into the stator slot, the stator windings can be introduced into the interspace. In this case, the insulation body present there firstly facilitates the positioning of the stator windings in the respective interspace and secondly can ensure the required electrical insulation of the stator winding vis-à-vis the cooling channel or the coolant passed through the cooling channel during operation of the electrical machine, that is to say serves in particular as a heat transfer medium. This last means that waste heat generated by the stator winding can be transferred via the plastic to the cooling channel which is present in the interspace and through which coolant flows during operation of the machine. This effect can be improved by choosing a suitable plastic having a high thermal conductivity. Since a plastic typically has electrically insulating properties, it is additionally possible for the stator windings arranged within the insulation body to be electrically insulated from the stator teeth. An undesired electrical short circuit between the conductor elements of the stator winding can be precluded in this way—even in the case of damaged winding insulation.

A machine according to the invention comprises a rotor, which is rotatable about a rotation axis defining an axial direction of the electrical machine, and a stator having electrically conductive stator windings. Furthermore, the machine comprises at least one cooling channel through which a coolant can flow, for cooling the stator windings. In this case, the stator has stator teeth extending along the axial direction and arranged at a distance from one another along a circumferential direction of the rotor, said stator teeth protruding, preferably radially inward, from a stator body of the stator and carrying the stator windings. An interspace is in each case formed between two stator teeth which are adjacent in the circumferential direction. According to the invention, an insulation body is arranged or accommodated in at least one interspace. Preferably, such an insulation body is arranged in a plurality of interspaces of the stator, particularly preferably in all of the interspaces. Said insulation body comprises outer walls composed of a plastic, which partly delimit a body interior. Preferably, the plastic is embodied in electrically insulating fashion. Moreover, the plastic can also be used for heat transfer. At least one winding zone for receiving a stator winding and at least one channel zone for receiving a cooling channel are present in the body interior. According to the invention, a stator winding is arranged in the at least one winding zone of the insulation body. Likewise, a cooling channel for a coolant to flow through is arranged in the at least one channel zone of the insulation body.

In one preferred embodiment, the insulation body has at least one separating wall composed of the, preferably electrically insulating, plastic, which at least one separating wall subdivides the body interior into the at least one winding zone and into the at least one channel zone. If, after the insulation body has been mounted in the stator slot, in the course of the assembly of the stator, the stator windings are arranged in the winding zone and the cooling channel is arranged in the channel zone of the insulation body, then an undesired electrical short circuit between the stator winding—even in the case of damage to winding insulation—and the cooling channel with the coolant can be precluded in this way.

In one preferred development, two channel zones for receiving a first and a second cooling channel are provided in the body interior. In this development—in the cross section perpendicular to the axial direction—the at least one winding zone is arranged between the two channel zones and is separated from these two channel zones by means of two separating walls. Such a geometric arrangement of the stator windings relative to the two cooling channels makes it possible to transfer waste heat from the stator winding to the two cooling channels on both sides. Particularly intense cooling of the stator windings can be achieved in this way.

In a further advantageous development, rather than just a single winding zone, two winding zones are provided, which are arranged adjacent to one another in the cross section perpendicular to the axial direction. In this advantageous development, the winding zones are separated from one another by means of a phase insulation composed of the plastic. An undesired electrical short circuit between conductor elements arranged in the two different winding zones is precluded in this way. This holds true particularly if an electrically insulating plastic is chosen as material for the separating wall. This allows conductor elements to be arranged in the two winding zones, which, in a manner electrically isolated from one another, can be connected to different electrical phases of a power source. This may be necessary, for example, if the electrical machine is intended to be operated as a two-phase machine.

Expediently, said phase insulation can be formed by a further separating wall of the insulation body. Particularly preferably, said separating wall is formed materially uniformly or even integrally on the outer walls of the insulation body. This variant is associated with particularly low manufacturing costs.

In one preferred embodiment, the outer walls and the at least one separating wall extend along an axial direction. In this embodiment, in a cross section perpendicular to the axial direction the at least one winding zone and the channel zone are arranged adjacent to one another. This makes it possible to arrange the stator windings and the cooling channel for cooling the stator winding directly adjacent to one another. A particularly effective heat transfer from the stator winding to the cooling channel can be achieved in this way. At the same time, the desired electrical insulation between stator windings and cooling channel is ensured by means of the separating wall.

Expediently, the insulation body can have the geometric shaping of a parallelepiped. In the cross section perpendicular to the axial direction, the insulation body can likewise expediently have the geometry of a trapezium, preferably of a rectangle. This means that the insulation body is provided with a geometry which typically corresponds to that of the stator slot into which the insulation body is inserted in the course of the assembly of the stator of the electrical machine. In variants, other geometries are also conceivable, wherein in the case of such alternative geometries, too, it holds true that the latter particularly preferably substantially correspond to the geometry of the relevant stator slot in which the insulation body is inserted.

In accordance with another advantageous development, an axial stop can be formed on at least one outer wall at an axial end of the insulation body with respect to the axial direction. Such an axial stop facilitates the inserting of the insulation body into the respective interspace along the axial direction. In particular, a correct axial positioning of the insulation body in the interspace is ensured.

In accordance with one development which is particularly preferred because it is implementable technically in a simple manner, the axial stop can be formed as an outwardly protruding wall collar shaped, preferably integrally, on at least one outer wall of the insulation body. This embodiment is associated with particularly low production costs.

In one advantageous development, a spacer structure is provided on at least two outer walls, by means of which spacer structure the outer walls are insertable into a stator slot of the stator of an electrical machine at a defined distance. The insertion of the insulation body into the respective interspace forming the stator slot is facilitated in this way. In particular, the insulation body can thus be positioned particularly accurately in the interspace. The gap between the outer walls and the stator teeth and/or the stator body, which gap possibly arises on account of the insulation body being arranged at a distance from the two stator teeth and/or from the stator body, can be filled with a heat transfer layer composed of plastic, which facilitates the heat transfer to the coolant flowing through the cooling channel.

Particularly preferably, said spacer structure is formed by projections arranged on an outer side of the respective outer wall facing away from the body interior. This embodiment is technically implementable particularly easily and is associated with cost advantages during production.

In accordance with one advantageous development, said projections can be shaped integrally on the outer wall. This embodiment, too, proves to be particularly cost-effective.

Expediently, the insulation body can be an injection-moulded part. Such an injection-moulded part is able to be produced technically in a simple manner and is therefore able to be manufactured particularly cost-effectively, in particular in large numbers. Alternatively or additionally, the insulation body can be a monolithic body. This likewise has an advantageous effect on the manufacturing costs. As an alternative or in addition thereto, the insulation body can be an extruded body.

In one preferred embodiment, the insulation body is inserted into the interspace. Such insertion of the insulation body into the interspace simplifies the mounting of the prefabricated insulation body in the respective interspace and thus the assembly of the stator of the machine.

Expediently, the axial direction of the insulation body extends parallel to the axial direction of the electrical machine.

Particularly expediently, the insulation body arranged in the interspace extends along an entire interspace length measured along the axial direction of the machine.

Particularly preferably, the insulation body comprises two channel zones arranged in a radially inner and in a radially outer end section of the interspace in a cross section perpendicular to the axial direction. In this variant, a first cooling channel is arranged in a first channel zone and a second cooling channel is arranged in a second channel zone. In this way, enough structural space for receiving a stator winding with a large number of conductor elements is afforded in the region between the two channel zones or end sections. At the same time, effective cooling of these stator windings is ensured by two cooling channels at the same time.

Expediently, the first channel zone with the first cooling channel can be arranged in a radially inner end section of the interspace and the second channel zone with the second cooling channel can be arranged in a radially outer end section of the interspace. The stator winding is arranged between the two cooling channels with respect to the radial direction, with the result that effective heat transfer from the stator winding to the coolant passed through the two cooling channels becomes possible.

Preferably, the at least one winding zone is arranged between the two channel zones along the radial direction of the stator. Particularly preferably, both winding zones, that is to say the first and second winding zones, are arranged, preferably directly next to one another, between the two channel zones along the radial direction. Along the radial direction, therefore, in this variant, the first channel zone, the first winding zone, the second winding zone and the second channel zone are arranged next to one another from radially on the inside to radially on the outside.

In a further advantageous development, the insulation body comprises two winding zones, which are arranged adjacent to one another in the cross section perpendicular to the axial direction. In this development, the two winding zones are separated from one another by means of a phase insulation composed of the plastic. This allows conductor elements of the stator winding provided in the interspace to be arranged in the two winding zones, which are intended to be connected to different electrical phases of a power source. This may be necessary if the machine is intended to be operated as a two-phase machine.

In accordance with another preferred embodiment, the stator winding is part of a distributed winding. In this variant, the insulation body is formed such that it is open radially inward, that is to say toward the opening of the interspace or the stator slot. The corresponding outer wall of the insulation body can be omitted for this purpose.

In accordance with one advantageous development, the winding comprises first and second conductor elements. In this development, the first conductor elements are arranged in the first winding zone and are electrically connected to one another for the purpose of connection to a common first phase of an electrical power source. Analogously, in this development, the second conductor elements are arranged in the second winding zone and are electrically connected to one another for the purpose of connection to a common second phase of the electrical power source. This allows the electrical machine to be operated as a two-phase electrical machine with high operational reliability.

Particularly preferably, in the cross section perpendicular to the axial direction at least one first or/and second conductor element of the stator winding arranged in the interspace is surrounded by the plastic. Particularly preferably, this holds true for all first or/and second conductor elements of the stator winding. In this way it is ensured that an undesired electrical short circuit of the stator winding with the coolant flowing through the cooling channel cannot occur.

Expediently, the first or/and the second conductor elements can be formed as winding bars composed of an electrically conductive material. Particularly preferably, these conductor elements are formed in mechanically stiff fashion and such an embodiment of the conductor elements as winding bars, in particular composed of a mechanically stiff material, facilitates the introduction of the conductor elements into the insulation body arranged in the interspace of the stator for the assembly of the electrical machine.

A further preferred embodiment according to which in the cross section perpendicular to the axial direction at least one winding bar, preferably all the winding bars, has/have the geometry of a rectangle having two narrow sides and having two broad sides proves to be particularly structural-space-saving.

Particularly preferably, the first conductor elements are electrically insulated from the second conductor elements by means of the phase insulation. An undesired electrical short circuit between two conductor elements which are connected or are intended to be connected to different electrical phases of a power source can be avoided in this way.

In accordance with a further advantageous development, a first heat transfer layer composed of plastic is arranged between the stator winding and the insulation body. The dissipation of heat from the stator winding can be improved in this way. In particular, the undesired formation of air gaps or air inclusions that would reduce the heat dissipation from the stator winding can be avoided.

In addition, a first heat transfer layer can be arranged between at least two adjacent conductor elements. An undesired electrical short circuit between two adjacent conductor elements can be prevented in this way.

In accordance with a further preferred embodiment, a second heat transfer layer composed of plastic is arranged between the cooling channel and the insulation body. The transfer of heat to the cooling channel or the coolant flowing through the cooling channel can thus be improved. In particular, the undesired formation of air gaps or air inclusions that would reduce the heat transfer toward the cooling channel can be avoided.

As an alternative or in addition to the first and/or second heat transfer layer, a third heat transfer layer composed of plastic can be arranged between the insulation body and the stator body with the two adjacent stator teeth. The dissipation of heat transfer from the stator teeth or from the stator body can be improved in this way. In particular, the undesired formation of an air gap or an air inclusion that would reduce the heat transfer away from the stator teeth or from the stator body can be avoided.

Expediently, the first conductor elements can be arranged in the radially inner winding zone and can be electrically connected to one another for the purpose of connection to a common first phase of an electrical power source. In this variant, the second conductor elements are arranged in the radially outer winding zone and are electrically connected to one another for the purpose of connection to a common second phase of the electrical power source. This variant allows the realization or the operation of the machine as a two-phase machine in conjunction with only little structural space requirement. In particular, in this way a particularly large number of conductor elements of the stator winding can be arranged in a respective interspace, which increases the performance of the electrical machine.

In accordance with a further preferred embodiment, in the cross section perpendicular to the axial direction at least one first or/and second conductor element, preferably all the first or/and second conductor elements, is/are surrounded by the plastic. In this way, the electrical insulation of the conductor elements, in particular vis-à-vis the cooling channel, is improved in redundant fashion.

Expediently, the spacer structure of the insulation body can be supported on the stator teeth and, alternatively or additionally, on the stator body. In this way, the insulation body is fixed mechanically stably in the interspace.

In a further advantageous development, a supporting structure can be provided on those surface sections of the two stator teeth or/and of the stator body which face the interspace, the outer walls of the insulation body being supported on said supporting structure, such that said outer walls are arranged at a distance from the stator teeth or/and from the stator body, respectively. The insertion of the insulation body into the respective interspace forming the stator slot is facilitated in this way. In particular, the insulation body can be positioned particularly accurately in the interspace in this way. The air gaps or air inclusions between the outer walls and the stator teeth and/or the stator body, which air gaps or air inclusions possibly arise on account of the insulation body being arranged at a distance from the two stator teeth and/or from the stator body, can then be filled with a heat transfer layer composed of plastic. This results in an improved transfer of heat generated at the stator teeth and at the stator body during operation of the machine to the coolant flowing through the cooling channel.

Expediently, the supporting structure is formed by projections protruding from the stator teeth or/and from the stator body, respectively, into the interspace. This embodiment is technically implementable particularly easily and is thus associated with cost advantages during production.

In accordance with one advantageous development, the projections are formed integrally on the stator teeth or/and on the stator body, respectively. This embodiment proves to be particularly cost-effective.

In another preferred embodiment, an additional cooling channel is formed in the stator body, in particular in the region of the stator body between the two stator teeth delimiting the interspace. Such an additional cooling channel can be embodied for instance in the form of a perforation or in the form of a hole in the respective stator body. Particularly preferably, the additional cooling channel is arranged in a region of the stator body which delimits the interspace radially on the outside and adjoins the interspace from said interspace radially inward. In this way it is possible to produce an additional cooling effect in the interspace, which is associated with improved dissipation of heat from the stator winding arranged in said interspace.

In another preferred embodiment, the plastic of the first heat transfer layer is formed by a, preferably electrically insulating, first plastic material. Alternatively or additionally, in this embodiment, the plastic of the second heat transfer layer can be formed by a, preferably electrically insulating, second plastic material. Alternatively or additionally, in this embodiment, the plastic of the third heat transfer layer can be formed by a, preferably electrically insulating, third plastic material. Alternatively or additionally, in this embodiment, the plastic of the insulation body, in particular of the outer walls of the insulation body, can be formed by a, preferably electrically insulating, fourth plastic material.

Expediently, the first plastic material or/and the second plastic material or/and the third plastic material or/and the fourth plastic material can be a thermoplastic. Alternatively or additionally, the first plastic material or/and the second plastic material or/and the third plastic material or/and the fourth plastic material can be a thermosetting plastic. In this case, the thermal conductivity of both thermosetting plastics and thermoplastics is settable by the choice of the material composition. Consequently, the thermal conductivity of a thermoplastic can be greater than or equal to that of a thermosetting plastic, and vice versa. A use of thermoplastics has various advantages over the use of thermosetting plastics. By way of example, owing to the reversible shaping process employed during their processing, thermoplastics exhibit better recyclability or have lower brittleness and improved damping properties in comparison with thermosetting plastics. However, since thermoplastics are usually more expensive to procure than thermosetting plastics, it is recommended to use thermoplastics selectively, for cost reasons. The use of a thermosetting plastic having a reduced thermal conductivity set in those regions which should be regarded as less critical concerning heat transfer is associated with reduced production costs for the electrical machine.

Expediently, the first or/and second or/and third or/and fourth plastic material have identical thermal conductivities. Alternatively or additionally, the first or/and second or/and third or/and fourth plastic material can have different thermal conductivities.

Expediently, the first or/and second or/and third or/and fourth plastic material can be identical materials. Likewise, the first or/and second or/and third or/and fourth plastic material can, however, also be different materials.

Expediently, the thermal conductivity of the plastic, in particular of the first or/and second or/and third or/and fourth plastic material, is at least 0.5 W/m K, preferably at least 1 W/m K.

In accordance with one particularly preferred embodiment, the stator winding is part of a distributed winding.

The invention also relates to a motor vehicle comprising an electrical machine explained above. The above-explained advantages of the electrical machine are therefore also applicable to the motor vehicle according to the invention.

Further important features and advantages of the invention are evident from the dependent claims, from the drawings and from the associated description of the figures with reference to the drawings.

It goes without saying that the features mentioned above and those yet to be explained below are usable not only in the combination respectively indicated, but also in other combinations or by themselves, without departing from the scope of the present invention.

Preferred exemplary embodiments of the invention are illustrated in the drawings and are explained in greater detail in the following description.

BRIEF DESCRIPTION OF THE DRAWINGS

In the figures, schematically in each case:

FIG. 1 shows one example of an insulation body according to the invention in an isometric illustration, FIG. 2 shows the insulation body from FIG. 1 in a sectional illustration.

DETAILED DESCRIPTION

Figure 3:
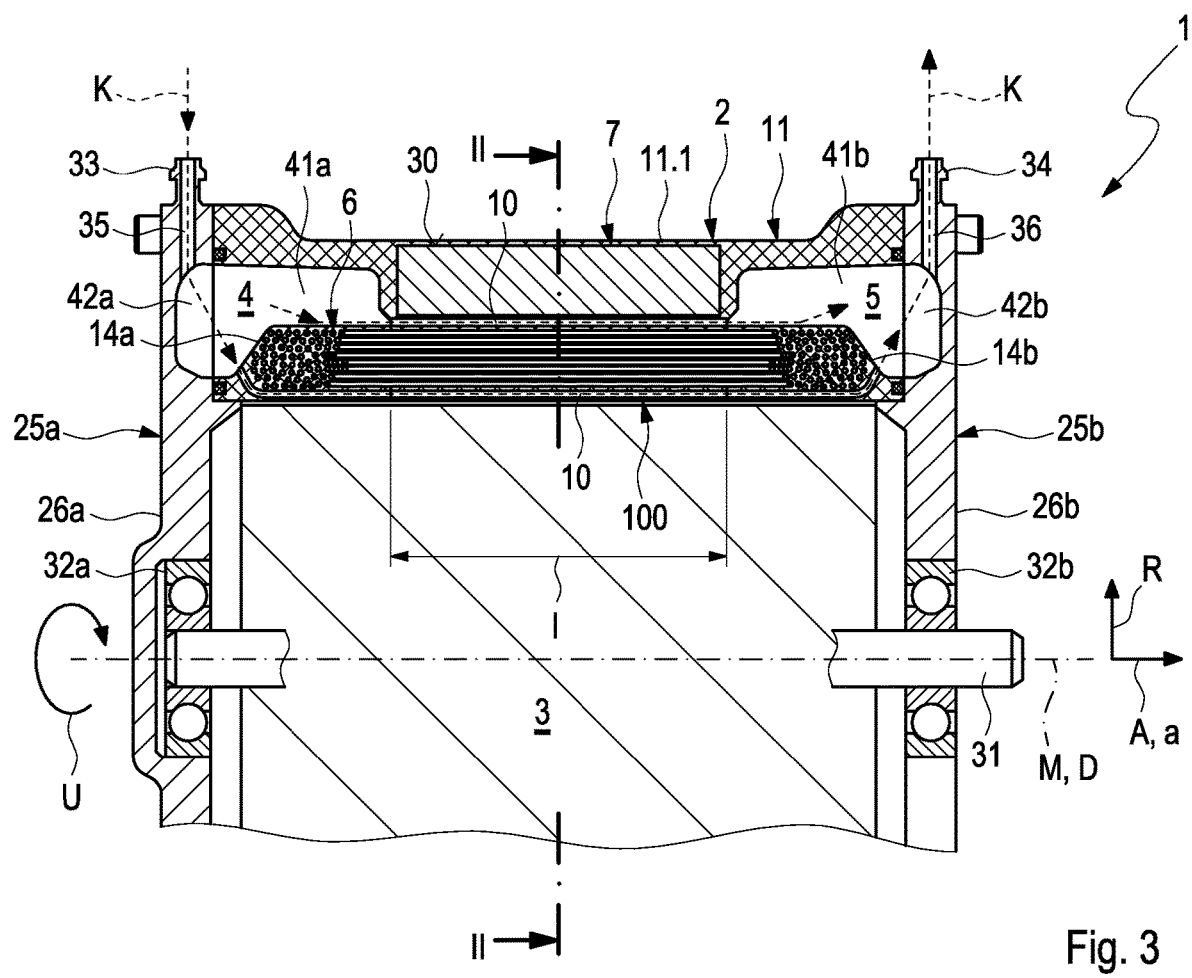
FIG. 3 shows one example of an electrical machine according to the invention comprising an insulation body from FIGS. 1 and 2.

FIGS. 1 and 2 illustrate one example of an insulation body 100 according to the invention composed of plastic 11 for a stator of an electrical machine. Expediently, the insulation body 100 is an injection-moulded part. The insulation body 100 can moreover be a monolithic body and, alternatively or additionally, an extruded body.

FIG. 1 shows the insulation body 100 in an isometric illustration, and FIG. 2 shows it in a sectional illustration. The insulation body 100 delimits a body interior 104. In accordance with FIG. 1, the insulation body 100 has the geometric shaping of a parallelepiped. This parallelepiped is formed by four outer walls 101a, 101b, 101d composed of plastic 11. The four outer walls 101a-d extend along an axial direction a. In the cross section perpendicular to the axial direction a as shown in FIG. 2, the outer walls 101a-d form two narrow sides 102a, 102b and two broad sides 103a, 103b. The two narrow sides 102a, 102b are opposite one another. Analogously, the two broad sides 103a, 103b are opposite one another. The two narrow sides 102a, 102b are preferably arranged orthogonally to the two broad sides 103a, 103b.

As revealed by FIGS. 1 and 2, the body interior 104 is subdivided into a first and a second winding zone 106a, 106b and into a first and a second channel zone 107a, 107b by separating walls 105a, 105b, 105c composed of plastic 11, which likewise extend along the axial direction a. The first separating wall 105a is thus arranged between the first winding zone 106a and the first channel zone 107a. The second separating wall 105b is arranged between the second winding zone 106b and the second channel zone 107b.

The third separating wall 105c is arranged between the first and second winding zones 106a, 106b. In the cross section shown in FIG. 2, the three separating walls 105a, 105b, 105c in each case extend parallel to one another and additionally extend parallel to the two outer walls 101a, 101b. Accordingly, the three separating walls 105a, 105b, 105c extend orthogonally to the two outer walls 101c, 101d.

The two channel zones 107a, 107b serve to receive a first and respectively a second cooling channel (not shown in FIGS. 1 and 2). Analogously, the two winding zones 106a, 106b serve to receive conductor elements of the stator winding (not shown in FIGS. 1 and 2).

As revealed by FIGS. 1 and 2, the two winding zones 106a, 106b are arranged adjacent to one another and next to one another. The two winding zones 106a, 106b are additionally arranged between the two channel zones 107a, 107b. Furthermore, the two winding zones 106a, 106b are electrically isolated and spatially separated from one another by means of a phase insulation 108 composed of plastic 11. The phase insulation 108 is formed by the separating wall 105c already presented.

In accordance with FIG. 1, an axial stop 109 can be formed at an axial end 111 of the four outer walls 101a-101d of the insulation body 100.

The axial stop 109 can be formed as an outwardly protruding, partly or completely circumferential wall collar 110 shaped integrally on all four outer walls 101a-d of the insulation body 100.

Figure 4:
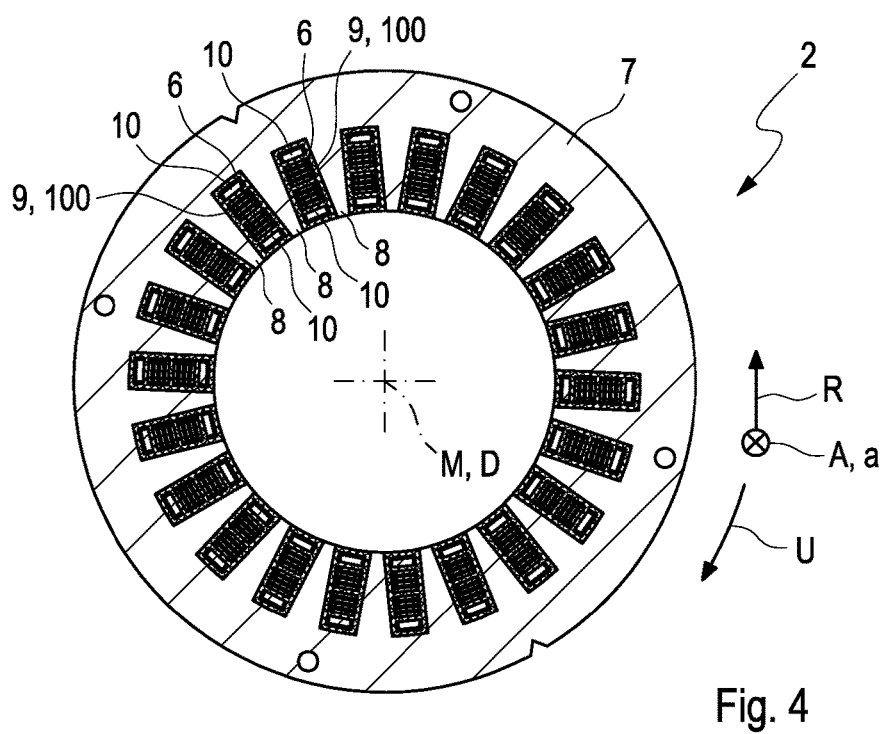
FIG. 4 shows the stator of the electrical machine in accordance with FIG. 3 in a cross section perpendicular to the rotation axis of the rotor.

An electrical machine 1 comprising the insulation body 100 presented above is presented below with reference to FIGS. 3 and 4. The electrical machine 1 is dimensioned such that it can be used in a vehicle, preferably in a road vehicle. FIG. 3 shows the machine 1 in a longitudinal section, and FIG. 4 shows it in a cross section.

The electrical machine 1 comprises a rotor 3, which is merely illustrated roughly schematically in FIG. 3, and a stator 2. For elucidation, FIG. 4 illustrates the stator 2 in a cross section perpendicular to the rotation axis D along the sectional line II-II from FIG. 3 in a separate illustration. In accordance with FIG. 3, the rotor 3 has a rotor shaft 31 and can have a plurality of magnets, not illustrated more specifically in FIG. 3, the magnetic polarization of which magnets alternates along the circumferential direction U. The rotor 3 is rotatable about a rotation axis D, the position of which is defined by the central longitudinal axis M of the rotor shaft 31. The rotation axis D defines an axial direction A extending parallel to the rotation axis D. A radial direction R is perpendicular to the axial direction A. A circumferential direction U rotates about the rotation axis D.

As can be discerned from FIG. 3, the rotor 3 is arranged in the stator 2. Consequently, the electrical machine 1 shown here is a so-called internal rotor. However, a realization as a so-called external rotor is also conceivable, in which the rotor 3 is arranged outside the stator 2. The rotor shaft 31 is mounted in a first shaft bearing 32a and, axially at a distance therefrom, in a second shaft bearing 32b rotatably about the rotation axis D on the stator 2.

The stator 2 additionally comprises, in a known manner, a plurality of stator windings 6, which are electrically energizable for the purpose of generating a magnetic field. Magnetic interaction between the magnetic field generated by the magnets of the rotor 3 and the magnetic field generated by the electrically conductive stator windings 6 causes the rotor 3 to rotate.

The cross section in FIG. 4 reveals that the stator 2 can have a ring-shaped stator body 7, for example composed of iron. In particular, the stator body 7 can be formed from a plurality of stator body plates (not shown) which are stacked one on top of another along the axial direction A and are adhesively bonded to one another. A plurality of stator teeth 8 are integrally formed on the stator body 7 radially on the inside, which stator teeth extend along the axial direction A, protrude away from the stator body 7 radially inward and are arranged at a distance from one another along the circumferential direction U. Each stator tooth 8 carries a stator winding 6. The individual stator windings 6 together form a winding arrangement. Depending on the number of magnetic poles to be formed by the stator windings 6, the individual stator windings 6 of the entire winding arrangement can be correspondingly electrically wired together.

During operation of the machine 1, the electrically energized stator windings 6 generate waste heat which has to be dissipated from the machine 1 in order to prevent overheating and associated damage or even destruction of the machine 1. Therefore, the stator windings 6 are cooled with the aid of a coolant K which is passed through the stator 2 and absorbs the waste heat generated by the stator windings 6 by means of heat transfer.

In order to pass the coolant K through the stator 2, the machine 1 comprises a coolant distributor chamber 4, into which a coolant K can be introduced via a coolant inlet 33. A coolant collector chamber 5 is arranged at a distance from the coolant distributor chamber 4 along the axial direction A. The coolant distributor chamber 4 communicates fluidically with the coolant collector chamber 5 by means of a plurality of cooling channels 10, only a single one of which is discernible in the illustration in FIG. 3. In a cross section perpendicular to the axial direction A, which cross section is not shown in the figures, the coolant distributor chamber 4 and the coolant collector chamber 5 can each have a ring-shaped geometry. Along the circumferential direction U, a plurality of cooling channels 10 are arranged at a distance from one another, which cooling channels extend in each case along the axial direction A from the ring-shaped coolant distributor chamber 4 to the ring-shaped coolant collector chamber 5. The coolant K introduced into the coolant distributor chamber 4 via the coolant inlet 33 can thus be distributed among the individual cooling channels 10. After flowing through the cooling channels 10 and absorbing heat from the stator windings 6, the coolant K is collected in the coolant collector chamber 5 and guided out of the machine 1 again via a coolant outlet 34 provided on the stator 2.

As revealed by the illustrations in FIGS. 3 and 4, interspaces 9 are formed between in each case two stator teeth 8 which are adjacent in the circumferential direction U. Said interspaces 9 are also known to a person skilled in the relevant art as so-called "stator slots" or "stator slits", which extend along the axial direction A just like the stator teeth 8. An insulation body 100 composed of plastic 11 for receiving a stator winding 6 and a cooling channel 10 is inserted in each interspace 9. In this case, the insulation body 100 is arranged in the respective interspace 9 in such a way that the axial direction a of the insulation body 100 extends parallel to the axial direction A of the electrical machine 1 or of the stator 2.

Expediently, the insulation body 100 arranged in the respective interspace 9 extends along an entire interspace length I measured along the axial direction A of the machine 1 (in this respect, also cf. FIG. 3).

Figure 5:
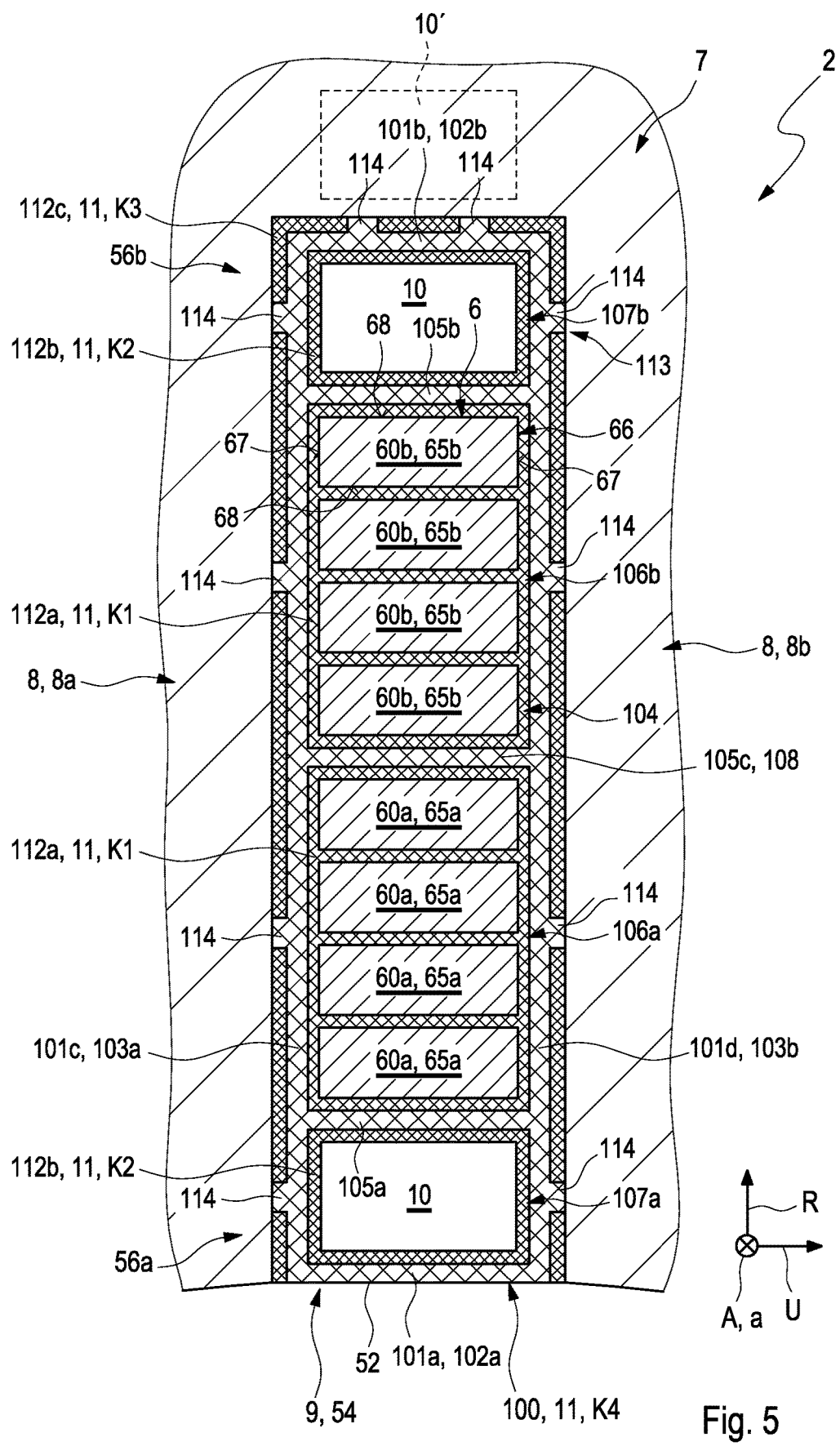
FIG. 5 shows a detailed illustration of the stator from FIG. 4 in the region of an interspace between two stator teeth which are adjacent in the circumferential direction.

The illustration in FIG. 5 is explained below, which shows a detailed illustration of an interspace 9 embodied between two stator teeth 8 which are adjacent in the circumferential direction U—said stator teeth hereinafter also being referred to as stator teeth 8a, 8b. FIG. 5 shows the interspace 9 in a cross section perpendicular to the axial direction A.

In accordance with FIG. 5, the interspace 9 has an opening 52 radially on the inside, that is to say is formed such that it is open radially on the inside. The interspace 9 can have the geometry of a trapezium, in particular of a rectangle, in the cross section perpendicular to the axial direction A. The same applies to the geometry of the insulation body 100 in said cross section. Particularly expediently, the interspace 9 and the insulation body 100 have the same geometry or outer contour. In the example in FIG. 5, a first cooling channel 10 is arranged in the region of a radially inner end section 56a of the interspace 9 or of the stator slot 54, that is to say in the region of the opening 52. A further, second cooling channel 10 is arranged in the region of a radially outer end section 56b of the interspace 9, that is to say in the vicinity of the stator body 7 delimiting the interspace 9 radially on the outside.

As revealed by FIG. 5, the stator winding 6 arranged in the interspace 9 or in the body interior 104 comprises first and second conductor elements 60a, 60b. The first conductor elements 60a are arranged in the first winding zone 59a of the insulation body 100 and can be electrically connected to one another for the purpose of connection to a common first phase of an electrical power source (not shown). This electrical connection can be effected axially outside the interspace 9 or the stator slot 54. The second conductor elements 60b are arranged in the second winding zone 59b of the insulation body 100 and can be electrically connected to one another for the purpose of connection to a common second phase of the electrical power source. This electrical connection, too, can be effected axially outside the interspace 9 or the stator slot 54. The first conductor elements 60a are thus electrically insulated from the second conductor elements 60b by means of the phase insulation 108.

As illustrated by FIG. 5, the first and second conductor elements 60a, 60b are embodied in each case as winding bars 65a, 65b composed of an electrically conductive material and—on account of their barlike embodiment—also in mechanically stiff fashion. In the cross section perpendicular to the axial direction A, the winding bars 65a, 65b each have the geometry of a rectangle 66 having two narrow sides 67 and having two broad sides 68.

The first channel zone 107a having the first cooling channel 10 is arranged in the radially inner end section 56a of the interspace 9 with respect to the radial direction R. Accordingly, the second channel zone 107b having the second cooling channel 10 is arranged in the radially outer end section 56b of the interspace 9 with respect to the radial direction R. Along the radial direction R, therefore, the two winding zones 106a, 106b are arranged between the two channel zones 107a, 107b. Along the radial direction R from radially on the inside to radially on the outside, therefore, the first channel zone 107a having the first cooling channel 10 is followed by the first winding zone 106a having the first conductor elements 60a. The first winding zone 106a is followed by the second winding zone 106b having the second conductor elements 60b, said second winding zone being followed in turn by the second channel zone 107b having the second cooling channel 10 along the radial direction R.

As additionally revealed by FIG. 5, a first heat transfer layer 112a composed of plastic 11 can be arranged between the first and/or second conductor elements 60a, 60b of the stator winding 6 and the insulation body 100 in the cross section perpendicular to the axial direction A. As shown in FIG. 5, the first heat transfer layer 112a can also be arranged between two adjacent conductor elements 60a, 60b. Preferably, all first and second conductor elements 60a, 60b are surrounded by the plastic 11 in the cross section perpendicular to the axial direction A.

As an alternative or in addition to the first heat transfer layer 112a, a (second) heat transfer layer 112b composed of plastic 11 can be arranged between the respective cooling channel 10 and the insulation body 100 in the cross section perpendicular to the axial direction A.

As additionally revealed by FIG. 5, a spacer structure 113 is formed on the outer walls 101a, 101c, 101d of the insulation body 100, by means of which spacer structure the outer walls 101a, 101c, 101d can be arranged at a distance from the stator teeth 8a, 8b and/or the stator body 7 in the interspace 9. The spacer structure 113 is expediently formed by projections 114 arranged on an outer side of the respective outer wall 101b, 101c, 101d facing away from the body interior 104 of the insulation body 100. Particularly expediently, the projections 114 can be shaped integrally on the respective outer wall 101a, 101c, 101d. The spacer structure 113 is thus supported on the stator teeth 8a, 8b and on the stator body 7. In a simplified variant of the example, the spacer structure 113 can be dispensed with.

The gap 61 arising between the outer walls 101b, 101c, 101d and the stator teeth 8a, 8b and/or the stator body 7 can be filled with a third heat transfer layer 112c composed of plastic 11. This means that as an alternative or in addition to the first and/or second heat transfer layer 112a, 112b, a third heat transfer layer 112c composed of plastic 11 can be arranged between the insulation body 100 and the stator body 7 with the two adjacent stator teeth in the cross section perpendicular to the axial direction A.

As indicated in a dashed illustration in FIG. 5, a further cooling channel 10' can be formed and arranged in the stator body 7, which is adjacent to the interspace 9 radially on the inside. Such an additional cooling channel 10' can be realized in the form of a hole or a perforation.

Figure 6:
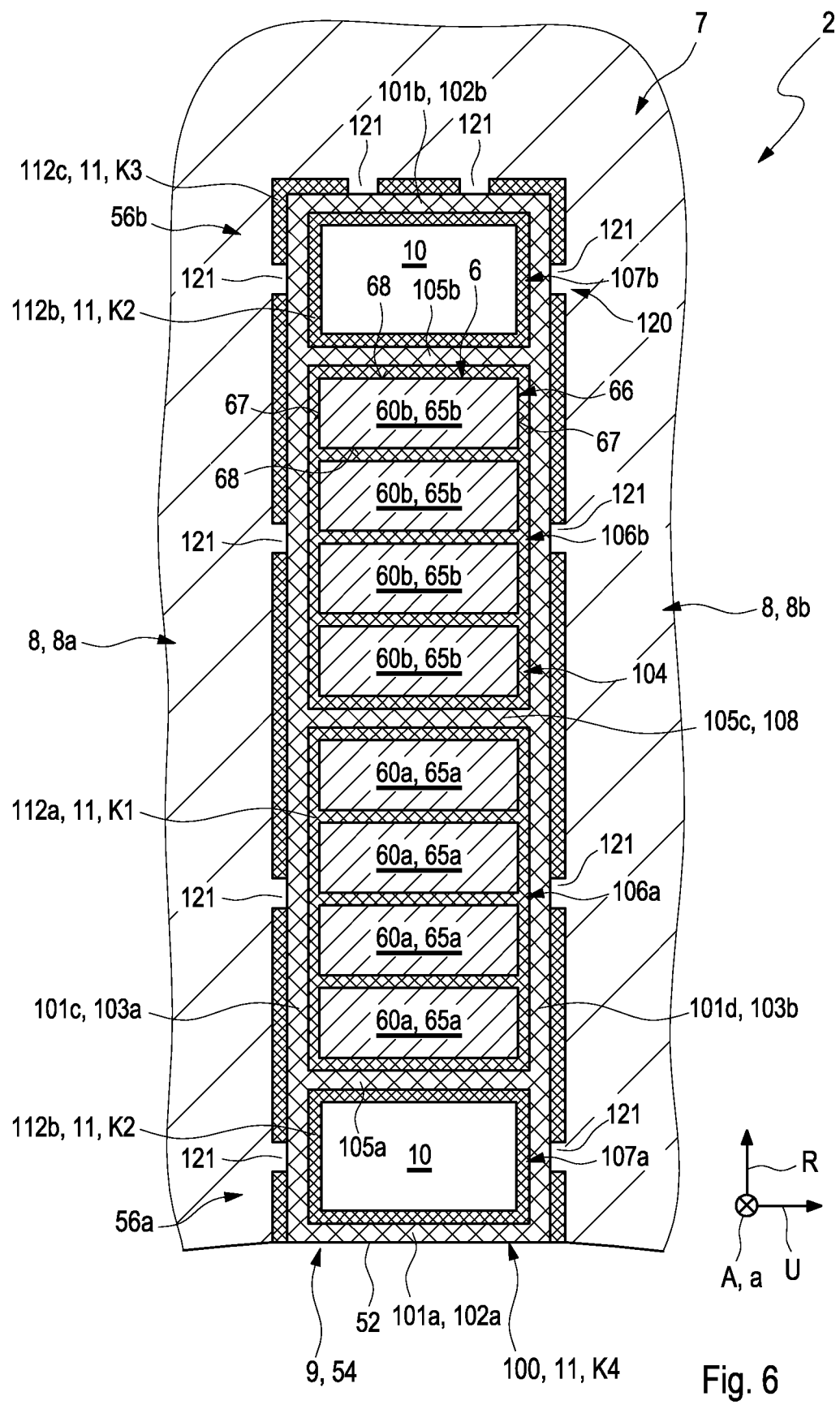
FIGS. 6 and 7 show variants of the example from FIG. 5.

FIG. 6 shows one variant of the example from FIG. 5. Only the differences between the two variants are explained below. In accordance with FIG. 6, a supporting structure 120 can be formed on those surface sections of the two stator teeth 8a, 8b and of the stator body 7 which face the interspace 9, on which supporting structure the outer walls 101b, 101c, 101d of the insulation body 100 can be supported. In a manner analogous to the spacer structure 113 of the insulation body 100, the supporting structure 120 can also be formed by projections 121 that protrude into the interspace 9 from the stator teeth 8a, 8b and/or from the stator body 7. The projections 121 of the supporting structure 120 can be shaped integrally on the two stator teeth 8a, 8b and/or on the stator body 7.

Figure 7:
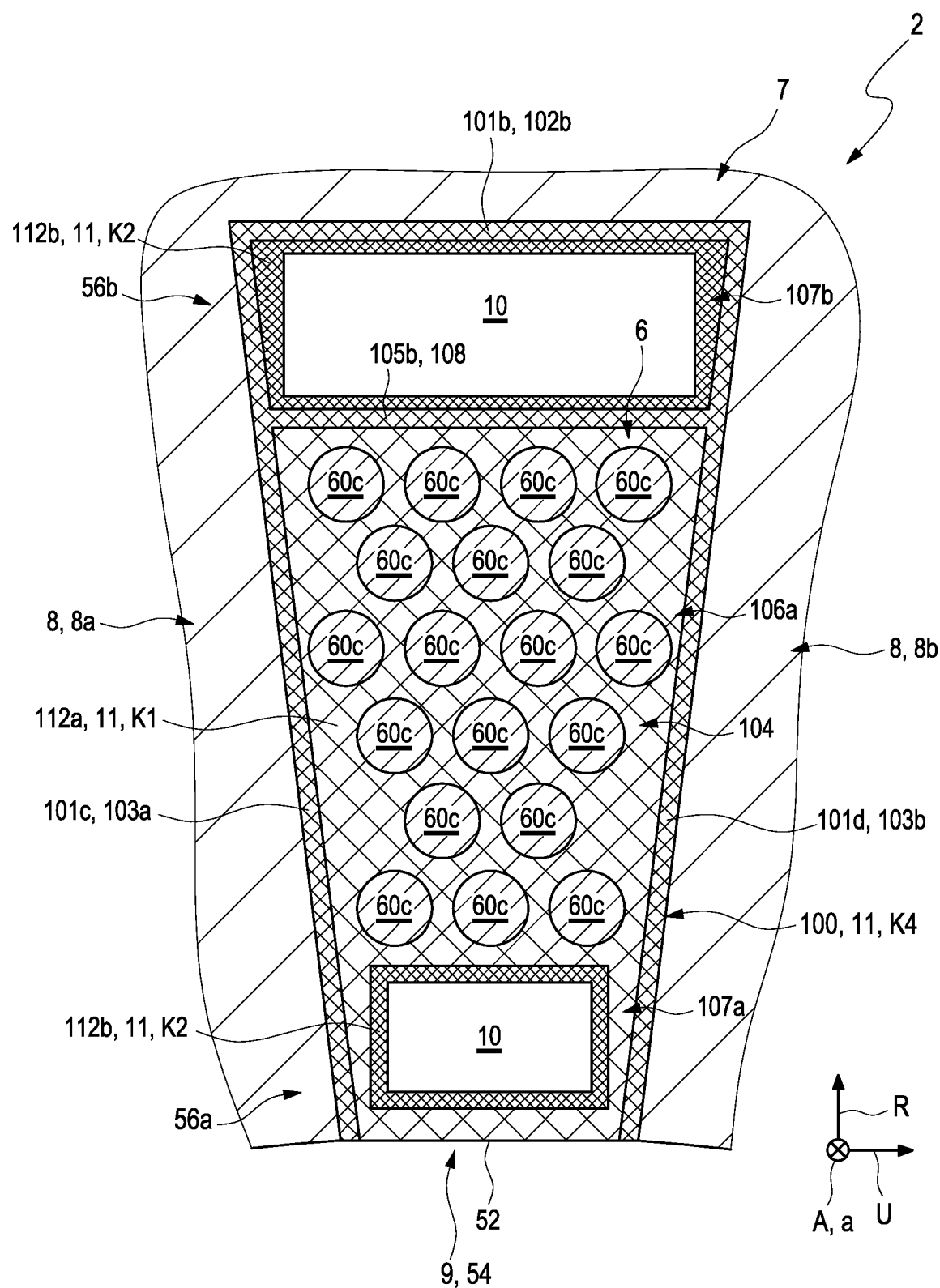

FIG. 7 shows a further variant of the example from FIG. 5. Only the differences between the two variants are explained below. In the example in FIG. 7, in the cross section perpendicular to the axial direction a, A, the insulation body 100 has the geometry of a trapezium having non-right-angled intermediate angles between respectively two adjacent outer walls 101a, 101b, 101c, 101d. Furthermore, a stator winding 6 having flexible conductor elements 60c is arranged in the sole winding zone 106a. In the example in FIG. 7, two cooling channels 10 are provided, wherein a first cooling channel 10 is arranged in the radially inner end section 56a of the interspace 9 and a second cooling channel 10 is arranged in the radially outer end section 56b of the interspace 9. Consequently, the first channel zone 107a of the insulation body 100 with the first cooling channel 10 is arranged in the region of the radially inner end section 56a. Accordingly, the second channel zone 107b with the second cooling channel 10 is arranged in the region of the radially outer end section 56b of the interspace 9. In the variant in FIG. 7, the insulation body 100 is formed such that it is open radially on the inside, that is to say toward the opening 52 of the interspace 9 or the stator slot 54. This means that the outer wall 101a of the insulation body 100 is omitted.

As revealed by FIG. 7, a separating wall 105b is provided only between the winding zone 106a and the second channel zone 107b. By contrast, such a separating wall is dispensed with between the winding zone 106a and the first channel zone 107a. In one variant, such a separating wall can be provided here as well. Accordingly, in a further variant, the outer wall 105c shown in FIG. 7 can be dispensed with. Further combination possibilities emerge which are evident to the person skilled in the relevant art directly from FIG. 7 and will therefore not be explained explicitly.

In the exemplary scenario, the plastic 11 of the first heat transfer layer 112a is formed by an electrically insulating first plastic material K1, the plastic 11 of the second heat transfer layer 112b is formed by an electrically insulating, second plastic material K2, and the plastic 11 of the third heat transfer layer 112c is formed by an electrically insulating, third plastic material K3. The plastic 11 of the electrical insulation body 100, in particular of the outer walls 101a-101d of the electrical insulation body 100, is formed by a likewise electrically insulating, fourth plastic material K4.

In the example in the figures, the fourth plastic material K4 of the insulation body 100 is a thermosetting plastic, whereas the first, second and third plastic materials K1, K2, K3 of the three heat transfer layers 112a, 112b, 112c are a thermoplastic. It goes without saying that, in variants in respect thereof, other assignments of thermoplastic and thermosetting plastic to the four plastic materials K1, K2, K3, K4 are also possible. In the exemplary scenario, the first, second and fourth plastic materials K1, K2, K4 each have a higher thermal conductivity than the third plastic material K3. An effective heat transfer from the stator winding 6 to the cooling channels 10 is ensured in this way. In the example in the figures, the four plastic materials K1, K2, K3, K4 are different materials. The thermal conductivity of all four plastic materials K1, K2, K3, K4 in this case is at least 0.5 W/m K, preferably at least 1 W/m K.

In the text that follows, reference is made once again to FIG. 3. In accordance with FIG. 1, the stator 2 having the stator body 7 and the stator teeth 8 is arranged axially between a first and a second end shield 25a, 25b.

As revealed by FIG. 3, a part of the coolant distributor chamber 4 is arranged in the first end shield 25a and a part of the coolant collector chamber 5 is arranged in the second end shield 25b. The coolant distributor chamber 4 and the coolant collector chamber 5 are thus in each case partly formed by a cavity 41a, 41b provided in the plastic composition 11. The first cavity 41a is supplemented here by a cavity 42a embodied in the first end shield 25a to form the coolant distributor chamber 4. Correspondingly, the second cavity 41b is supplemented by a cavity 42b embodied in the second end shield 25b to form the coolant collector chamber 5. In the embodiment variant explained above, the plastic 11 thus at least partly delimits the coolant distributor chamber 4 and the coolant collector chamber 5.

Furthermore, a coolant feed 35 can be embodied in the first end shield 25a and fluidically connects the coolant distributor chamber 4 to a coolant inlet 33 provided on the outside, in particular on the circumferential side as illustrated in FIG. 1, on the first end shield 25a. Correspondingly, a coolant discharge 36 can be embodied in the second end shield 25b and fluidically connects the coolant collector chamber 5 to a coolant outlet 34 provided on the outside, in particular on the circumferential side as illustrated in FIG. 1, on the end shield 25b. This enables an arrangement of the coolant distributor chamber 4 and/or of the coolant collector chamber 5 in each case radially on the outside on the first and/or second end section 14a, 14b of the relevant stator winding 6 and also in the extension of said end sections 14a, 14b along the axial direction A. The end sections 14a, 14b of the stator windings 6, said end sections being particularly subjected to thermal loading during operation of the machine 1, are cooled particularly effectively by means of this measure as well.

In accordance with FIG. 3, the plastic 11 can also be arranged on an outer circumferential side 30 of the stator body 7 and can thus form a plastic coating 11.1 on the outer circumferential side 30. The stator body 7 of the stator 2, said stator body typically being formed from electrically conductive stator plates, can thus be electrically insulated from the surroundings. The provision of a separate housing for accommodating the stator body 7 can thus be obviated.

The invention claimed is:

1. An electrical machine, comprising:
    a rotor that is rotatable about a rotation axis defining an axial direction of the electrical machine, and including a stator having electrically conductive stator windings; and
    at least one cooling channel through which a coolant can flow, for cooling the stator windings;
    wherein the stator has stator teeth extending along the axial direction and arranged at a distance from one another along a circumferential direction of the rotor, the stator teeth protruding inwardly from a stator body of the stator and carrying the stator windings;
    wherein an interspace is formed between two stator teeth which are adjacent in the circumferential direction;
    wherein at least one interspace is arranged in an insulation body having outer walls composed of an electrically insulating plastic, which delimit a body interior, in which at least one winding zone for receiving a stator winding of the stator windings and at least one channel zone for receiving a cooling channel are provided;

wherein the stator winding of the stator windings is arranged in the at least one winding zone of the insulation body and the cooling channel for the coolant to flow through is arranged in the at least one channel zone of the insulation body; and wherein the insulation body has at least one separating wall composed of the electrically insulating plastic, which at least one separating wall subdivides the body interior into the at least one winding zone and into the at least one channel zone.

2. The electrical machine according to claim 1,
wherein two channel zones for receiving a first and a second cooling channel are present; and
wherein in the cross section perpendicular to the axial direction, the at least one winding zone is arranged between the two channel zones and is separated therefrom by means of two separating walls.

3. The electrical machine according to claim 1,
wherein two winding zones of the at least one winding zone are provided, which are arranged adjacent to one another in the cross section perpendicular to the axial direction; and
wherein the winding zones of the at least one winding zone are separated from one another by means of a phase insulation composed of the plastic.

4. The electrical machine according to claim 3,
wherein the phase insulation is formed by a separating wall of the insulation body.

5. The electrical machine according to claim 1,
wherein the insulation body is an injection-moulded part; and
wherein the insulation body is a monolithic body; and the insulation body is an extruded body.

6. The electrical machine according to claim 1,
wherein the insulation body includes two channel zones arranged in a radially inner and in a radially outer end section of the interspace in a cross section perpendicular to the axial direction of the machine; and
wherein a first cooling channel is formed in a first channel zone of the two channel zones, and a second cooling channel is formed in a second channel zone of the two channel zones.

7. The electrical machine according to claim 6,
wherein the first channel zone with the first cooling channel is arranged in a radially inner end section of the interspace and the second channel zone with the second cooling channel is arranged in a radially outer end section of the interspace.

8. The electrical machine according to claim 6,
wherein along a radial direction of the stator the at least one winding zone is arranged between the two channel zones.

9. The electrical machine according to claim 1,
wherein the insulation body included two winding zones arranged adjacent to one another in the cross section perpendicular to the axial direction; and
wherein the two winding zones are separated from one another by means of a phase insulation composed of the plastic.

10. The electrical machine according to claim 1,
wherein the stator winding is part of a distributed winding.

11. The electrical machine according to claim 1,
wherein the stator winding includes first and second conductor elements;
wherein the first conductor elements are arranged in a first winding zone of the winding zones and are electrically connected to one another for the purpose of connection to a common first phase of an electrical power source; and
in that the second conductor elements are arranged in a second winding zone of the winding zones and are electrically connected to one another for the purpose of connection to a common second phase of the electrical power source.

12. The electrical machine according to claim 11,
wherein a first heat transfer layer composed of the plastic is arranged between the stator winding and the insulation body.

13. The electrical machine according to claim 12,
wherein the first heat transfer layer is between at least two conductor elements arranged adjacent to one another.

14. The electrical machine according to claim 13,
wherein the first conductor elements are arranged in the first winding zone being a radially inner winding zone and are electrically connected to one another for the purpose of connection to a common first phase of an electrical power source; and
wherein the second conductor elements are arranged in the second winding zone being a radially outer winding zone and are electrically connected to one another for the purpose of connection to a common second phase of the electrical power source.

15. The electrical machine according to claim 12, further comprising a second heat transfer layer composed of plastic arranged between the cooling channel and the insulation body.

16. The electrical machine according to claim 15, further comprising a third heat transfer layer composed of plastic arranged between the insulation body and the stator body with the two stator teeth which are adjacent in the circumferential direction.

17. The electrical machine according to claim 16,
wherein the plastic of the first heat transfer layer is formed by an electrically insulating, first plastic material;
wherein the plastic of the second heat transfer layer is formed by an electrically insulating, second plastic material;
wherein the plastic of the third heat transfer layer is formed by an electrically insulating, third plastic material; and
wherein the plastic of the electrical insulation body, in particular of the outer walls, is formed by an electrically insulating, fourth plastic material.

18. The electrical machine according to claim 17,
wherein the first plastic material and the second plastic material and the third plastic material and the fourth plastic material are a thermoplastic; and
wherein the first plastic material and the second plastic material and the third plastic material and the fourth plastic material are a thermosetting plastic.

19. The electrical machine according to claim 17,
wherein at least one of the first and the second and third and the fourth plastic material are identical materials; or
wherein the first and the second and the third and the fourth plastic material are different materials.

20. The electrical machine according to claim 17,
wherein the thermal conductivity of the plastic, in particular of the first and the second and the third and the fourth plastic material is at least 0.5 W/m K, preferably at least 1 W/m K.

21. The electrical machine according to claim 11,
wherein the first conductor elements are electrically insulated from the second conductor elements by means of the phase insulation.

22. The electrical machine according to claim 1,
wherein a supporting structure is provided on surface sections of the two stator teeth and of the stator body which face the interspace, the outer walls of the insulation body being supported on the supporting structure, such that the outer walls are arranged at a distance from the stator teeth and from the stator body, respectively.

23. The electrical machine according to claim 22,
wherein the supporting structure is formed by projections protruding from the stator teeth and from the stator body, respectively, into the interspace.

24. The electrical machine according to claim 23,
wherein the projections are formed integrally on the stator teeth and on the stator body, respectively.

25. A motor vehicle comprising the electrical machine according to claim 1.

26. An electrical machine, comprising:
a rotor that is rotatable about a rotation axis defining an axial direction of the electrical machine, and including a stator having electrically conductive stator windings; and
at least one cooling channel through which a coolant can flow, for cooling the stator windings;
wherein the stator has stator teeth extending along the axial direction and arranged at a distance from one another along a circumferential direction of the rotor, the stator teeth protruding inwardly from a stator body of the stator and carrying the stator windings;
wherein an interspace is formed between two stator teeth which are adjacent in the circumferential direction;
wherein at least one interspace is arranged in an insulation body having outer walls composed of an electrically insulating plastic, which delimit a body interior, in which at least one winding zone for receiving a stator winding of the stator windings and at least one channel zone for receiving a cooling channel are provided;
wherein the stator winding of the stator windings is arranged in the at least one winding zone of the insulation body and the cooling channel for the coolant to flow through is arranged in the at least one channel zone of the insulation body;
wherein two channel zones for receiving a first and a second cooling channel are present; and
wherein in the cross section perpendicular to the axial direction the at least one winding zone is arranged between the two channel zones and is separated therefrom by means of two separating walls.

27. An electrical machine, comprising:
a rotor that is rotatable about a rotation axis defining an axial direction of the electrical machine, and including a stator having electrically conductive stator windings;
at least one cooling channel through which a coolant can flow, for cooling the stator windings;
wherein the stator has stator teeth extending along the axial direction and arranged at a distance from one another along a circumferential direction of the rotor, the stator teeth protruding inwardly from a stator body of the stator and carrying the stator windings;
wherein an interspace is formed between two stator teeth which are adjacent in the circumferential direction;
wherein at least one interspace is arranged in an insulation body having outer walls composed of an electrically insulating plastic, which delimit a body interior, in which at least one winding zone for receiving a stator winding of the stator windings and at least one channel zone for receiving a cooling channel are provided;
wherein the stator winding of the stator windings is arranged in the at least one winding zone of the insulation body and the cooling channel for the coolant to flow through is arranged in the at least one channel zone of the insulation body;
wherein two winding zones of the at least one winding zone are provided, which are arranged adjacent to one another in the cross section perpendicular to the axial direction;
wherein the winding zones of the at least one winding zone are separated from one another by means of a phase insulation composed of the plastic; and
wherein the phase insulation is formed by a separating wall of the insulation body.

28. An electrical machine, comprising:
a rotor that is rotatable about a rotation axis defining an axial direction of the electrical machine, and including a stator having electrically conductive stator windings;
at least one cooling channel through which a coolant can flow, for cooling the stator windings; and
a second heat transfer layer composed of plastic is arranged between the cooling channel and the insulation body;
wherein the stator has stator teeth extending along the axial direction and arranged at a distance from one another along a circumferential direction of the rotor, the stator teeth protruding inwardly from a stator body of the stator and carrying the stator windings;
wherein an interspace is formed between two stator teeth which are adjacent in the circumferential direction;
wherein at least one interspace is arranged in an insulation body having outer walls composed of an electrically insulating plastic, which delimit a body interior, in which at least one winding zone for receiving a stator winding of the stator windings and at least one channel zone for receiving a cooling channel are provided;
wherein the stator winding of the stator windings is arranged in the at least one winding zone of the insulation body and the cooling channel for the coolant to flow through is arranged in the at least one channel zone of the insulation body;
wherein the stator winding includes first and second conductor elements;
wherein the first conductor elements are arranged in a first winding zone of the winding zones and are electrically connected to one another for the purpose of connection to a common first phase of an electrical power source, and the second conductor elements are arranged in a second winding zone of the winding zones and are electrically connected to one another for the purpose of connection to a common second phase of the electrical power source; and
wherein a first heat transfer layer composed of the plastic is arranged between the stator winding and the insulation body.

29. An electrical machine, comprising:
a rotor that is rotatable about a rotation axis defining an axial direction of the electrical machine, and including a stator having electrically conductive stator windings;
at least one cooling channel through which a coolant can flow, for cooling the stator windings;
wherein the stator has stator teeth extending along the axial direction and arranged at a distance from one another along a circumferential direction of the rotor, the stator teeth protruding inwardly from a stator body of the stator and carrying the stator windings;
wherein an interspace is formed between two stator teeth which are adjacent in the circumferential direction;
wherein at least one interspace is arranged in an insulation body having outer walls composed of an electrically insulating plastic, which delimit a body interior, in which at least one winding zone for receiving a stator winding of the stator windings and at least one channel zone for receiving a cooling channel are provided;
wherein the stator winding of the stator windings is arranged in the at least one winding zone of the insulation body and the cooling channel for the coolant to flow through is arranged in the at least one channel zone of the insulation body;
wherein the stator winding includes first and second conductor elements;
wherein the first conductor elements are arranged in a first winding zone of the winding zones and are electrically connected to one another for the purpose of connection to a common first phase of an electrical power source, and the second conductor elements are arranged in a second winding zone of the winding zones and are electrically connected to one another for the purpose of connection to a common second phase of the electrical power source;
wherein a first heat transfer layer composed of the plastic is arranged between the stator winding and the insulation body;
wherein the first heat transfer layer is between at least two conductor elements arranged adjacent to one another;
wherein the first conductor elements are arranged in the first winding zone being a radially inner winding zone and are electrically connected to one another for the purpose of connection to a common first phase of an electrical power source; and
wherein the second conductor elements are arranged in the second winding zone being a radially outer winding zone and are electrically connected to one another for the purpose of connection to a common second phase of the electrical power source.

* * * * *